United States Patent [19]

Hardy

[11] Patent Number: 4,806,622
[45] Date of Patent: Feb. 21, 1989

[54] PROCESS FOR THE MANUFACTURE OF POLYACETALS

[75] Inventor: Nicolas Hardy, Jemeppe-sur-Sambre, Belgium

[73] Assignee: Solvay & Cie (Societe Anonyme), Brussels, Belgium

[21] Appl. No.: 58,933

[22] Filed: Jun. 5, 1987

[30] Foreign Application Priority Data

Jun. 6, 1986 [FR] France .................................. 86 08330

[51] Int. Cl.$^4$ .............................................. C08L 59/04
[52] U.S. Cl. ..................................... 528/249; 528/250; 528/497; 528/498; 528/501; 525/54; 525/472
[58] Field of Search ............... 528/249, 250, 497, 498, 528/501; 525/54, 472

[56] References Cited

U.S. PATENT DOCUMENTS

| | | | |
|---|---|---|---|
| 3,027,352 | 3/1962 | Walling et al. ........................ | 260/67 |
| 3,197,437 | 7/1965 | Wall ..................................... | 260/67 |
| 3,225,005 | 12/1965 | Asmuth et al. ....................... | 260/67 |
| 4,024,105 | 5/1977 | Sextro et al. ........................ | 528/250 |
| 4,087,411 | 5/1978 | Sugio et al. .......................... | 528/249 |
| 4,458,064 | 7/1984 | Chatterjee ........................... | 528/501 |

FOREIGN PATENT DOCUMENTS

| | | | |
|---|---|---|---|
| 1570335 | 2/1970 | Fed. Rep. of Germany ........ | 260/67 |
| 1287151 | 10/1962 | France . | |
| 54-87792 | 7/1979 | Japan . | |

OTHER PUBLICATIONS

Angew. Chem., vol. 79, pp. 512–514 (1967) "Preparation of Trioxane" by K. Weissermel et al.
Hydrocarbon Processing, vol. 45, pp. 155–170 (1966) "Polyacetal Resins-A 1966 Review" by M. Sittig et al.

Primary Examiner—Allan M. Lieberman
Attorney, Agent, or Firm—Spencer & Frank

[57] ABSTRACT

Polyacetal obtained by the polymerization of trioxane, for example, suspended in an organic solvent, in the presence of a comonomer (for example, ethylene oxide), is stabilized by hydrolysis in the heated state under pressure and then, after hydrolysis, the reaction mixture is depressurized to atmospheric pressure in order to release an aqueous phase containing the polymer and a vapor phase which contains formaldehyde and trioxane. According to the invention, the latter is recycled directly into the formaldehyde trimerization stage under reduced pressure.

5 Claims, 2 Drawing Sheets

PROCESS FOR THE MANUFACTURE OF POLYACETALS

FIELD OF THE INVENTION

The present invention relates to a process for the manufacture of polyacetals. More particularly, it relates to a process for this manufacture which involves the use of trioxane as the main monomer and depolymerization by selective hydrolysis of the end groups of the macromolecular chains of polyacetals.

TECHNOLOGY REVIEW

It is known, especially from the article by K. WEISSERMEL et al., published in Angew. Chem., Vol. 79, N 11, p. 512 et seq. (1967), that polyoxymethylenes or polyacetals which contain recurring —$CH_2O$— unit linkages are obtained by the polymerization of formaldehyde or its cyclic trimer, trioxane. In the latter case, cationic initiators are conventionally used. The copolymerization of trioxane with another compound used in a smaller proportion, for example a cyclic ether, a cyclic acetal, a cyclic ester or a vinyl compound in order to reduce the tendency of these polymers to become partially decomposed under the action of heat or of an alkali is known. The polymerization of trioxane may be carried out in the solid state, in the molten state, in gaseous phase, in suspension or in solution. In the case of suspension polymerization, it is possible to operate using hexane, cyclohexane, heptane and higher boiling point hydrocarbons in which, however, the trioxane monomer dissolves only partially as the suspension medium. As cationic initiators, coordination complexes of boron fluoride with electron donating organic compounds have frequently been mentioned.

In order to improve further the heat stability of the polyacetals obtained, a depolymerization may be carried out by selective hydrolysis of the unstable oxymethylene end groups of the polymer chains in the conventional way. Similar means are described, for example, in Celanese Corp. patent FR-A-No. 1,287,151.

A conventional process for the manufacture of polyacetals using trioxane as the main monomer and with the final stabilization by hydrolysis of the polymer obtained may therefore generally comprise the following simplified successive steps:

synthesis of trioxane by the trimerization of formaldehyde in an aqueous phase;
separation of trioxane from the said aqueous phase;
purification of the trioxane resulting from the above stage and of the recycled unpolymerized trioxane;
polymerization of the purified trioxane in the presence of a cationic initiator and a comonomer chosen from amongst the cyclic ethers containing at least two adjacent carbon atoms;
stabilizing hydrolysis of the polyacetal obtained; and
treatment of the mixture resulting from the hydrolysis stage in order to separate an aqueous suspension of the stabilized polyacetal therefrom.

For efficiency reasons, the stabilizing hydrolysis stage is generally carried out with the application of heat and pressure and the mixture resulting therefrom is depressurized; the vapours released, which contain unconverted trioxane, water and formaldehyde produced by the hydrolysis are then condensed and the condensed liquid is generally decanted with a view to separating, on the one hand, the trioxane which is recycled into the purification stage and, on the other hand, the water and the formaldehyde which are finally removed, most frequently by incineration.

This process, complicated by its part involving the treatment of the vapours released by the depressurization of the mixture resulting from the stabilizing hydrolysis, additionally has the disadvantage of giving rise to an entrainment of the polymer during this depressurization, blocking the condenser and the recycling circuits in the long term. Additionally, when the polymerization of trioxane is carried out in suspension in the presence of an organic solvent, the part of the latter which is not entrained with the vapours released during the depressurization of the mixture originating from the stabilizing hydrolysis stage is present in the aqueous suspension of polyacetal resulting from this stage and must be removed therefrom by an additional steam treatment ("stripping").

SUMMARY OF THE INVENTION

The object of the present invention is to provide a process for the manufacture of polyacetals, which does not have these disadvantages.

To this end, the invention relates to a process for the manufacture of polyacetals by the polymerization of trioxane, which comprises the following succesive main stages:

(a) trimerization of formaldehyde into trioxane in an acid aqueous phase;
(b) separation of the trioxane from the said aqueous phase;
(c) purification of the trioxane;
(d) polymerization of the purified trioxane in the presence of a cationic initiator and a comonomer chosen from amongst cyclic ethers containing at least two adjacent carbon atoms;
(e) stabilization by hydrolysis, in the heated state, under pressure, of the end groups of the macromolecular chains of the polymer;
(f) separation, by depressurization, of the mixture resulting from stage (e), on the one hand, into an aqueous suspension of the stabilized polymer and, on the other hand, into a vapour phase containing the unpolymerized trioxane, water and the formaldehyde produced by the hydrolysis; and
(g) recovery of the stabilized polymer from the aqueous suspension thereof;

the vapour phase originating from the separation, by depressurization, of the mixture resulting from stage (e) being recycled directly into the formaldehyde trimerization stage (a).

The principals involved in stages (a) to (g) constituting the process according to the invention are known and procedures for implementing them are described especially in "Petrochemical Developments", volume 45, No. 11, November 1966, pages 155 to 170 and in the patent FR-A-No. 1,287,151 mentioned above, the contents of which are incorporated by reference in the present description.

The implementing procedures generally adopted for carrying out steps (a) to (g) of the process according to the invention are mentioned below.

The formaldehyde trimerization stage (a) is carried out in an aqueous phase which is generally stirred, in the presence of an acid, which is generally a strong inorganic acid such as sulphuric acid or phosphoric acid, at a temperature sufficient to avoid the precipitation of the trimer; the reaction being in equilibrium, the equilibrium is shifted by vaporizing a part of the trimerization medium.

The stage (b) for the separation of trioxane from the aqueous phase in two stages, the first (b1) of which consists in increasing the trioxane content of the aqueous phase, preferably by rectification, and the second (b2) consists in extracting the trioxane from this aqueous phase, may be carried out by any conventional means such as, for example, extraction and crystallization; it is preferred to operate using an extractant organic solvent (S) generally chosen from amongst aliphatic, alicyclic and aromatic hydrocarbons and their mixtures.

As examples of aliphatic hydrocarbons, there may be mentioned alkanes such as n-hexane, n-heptane, n-octane, n-nonane, their isomers and mixtures.

As examples of alicyclic hydrocarbons, there may be mentioned cycloalkanes such as cyclohexane.

As examples of aromatic hydrocarbons, there may be mentioned benzene and its substitution derivatives such as toluene and xylenes.

In general, the extraction of trioxane is preferably carried out using an aliphatic hyrocarbon, especially an alkane or a mixture of alkanes containing from 7 to 9 carbon atoms.

The aqueous phase with a low trioxane content resulting, on the other hand, from the extraction stage (b2), is generally treated in order to separate therefrom the unconverted formol which is preferably recycled (stage (b3)) into the trimerization stage (a).

The trioxane purification stage (c) is carried out employing conventional means which are compatible with the physical form and the degree of purity desired for the polymerization stage (d). This purification is generally carried out by at least one of the methods below:

azeotropic distillation of a mixture containing trioxane, the extractant solvent (S) and an optional organic solvent, which is different from the extractant solvent (S), but chosen from amongst the same hydrocarbons, in order to obtain a sufficiently pure solution of trioxane in one of these solvents; and crystallization of a mixture containing the trioxane and the extractant solvent (S); this crystallization may be carried out by cooling or by mixing with cooled pure solvent (S).

The trioxane purification stage (c) is preferably carried out by first concentrating the mixture of trioxane with the extractant solvent (S) with respect to trioxane, for example by azeotropic distillation and then by recovering the trioxane by crystallization from the mixture thus concentrated.

The stage (d) for the polymerization of the purified trioxane is carried out, in a known manner, in the presence of a cationic initiator based on a coordination complex of boron fluoride with an organic oxygen-containing compound containing an electron-donating atom such as oxygen or sulphur.

The preferred catalysts are boron fluoride etherates.

When the polymerization takes place in the absence of an organic solvent, it is most generally carried out in trioxane in the molten state in which the comonomer(s) and the catalyst have been dissolved. However, the polymerization is preferably carried out in the presence of an organic solvent in which trioxane is at least partially soluble. This organic solvent is generally chosen from amongst the same hydrocarbons as the solvent S); preferably, it is the solvent (S) itself.

The polymerization medium also contains an appropriate amount of a comonomer chosen from amongst cyclic ethers, the molecule of which contains at least two adjacent carbon atoms. As examples of preferred comonomers, there may be mentioned ethylene oxide, 1,3-dioxolane, 1,3- and 1,4-dioxane, 1,3,5-trioxepane, 1,3,6-trioxocane, epichlorhydrin and 4-chloromethyl-1,3-trioxolane, ethylene oxide being particularly preferred. The polymerization is generally carried out under conditions such that the proportion of the recurrent units derived from the comonomer are present in the polymer at a concentration of 0.1 to 10 mol %, preferably at a concentration of 1 to 4 mol %.

The stage (e) of stabilization by the hydrolysis of the polymer obtained is carried out under general operating conditions chosen so as to bring about a depolymerization, by selective hydrolysis of the oxymethylene end groups contained between the last ethoxylated unit and the hydroxyl end group of the macromolecular chains.

This hydrolysis may be carried out in an organic medium, for example of the same nature as the polymerization medium; thus, the hydrolysis medium may advantageously be the polymerization medium itself. This hydrolysis is generally carried out by adding water containing, if required, an organic or inorganic compound of basic nature such as ammonium and alkali metal or alkaline earth metal hydroxides, amines, ureas, alcohols, and the like, to the said medium which is heated to a temperature lower than the degradation temperature of the polymer and subjected to a pressure greater than atmospheric pressure. A detailed description of suitable procedures for hydrolysis is contained, for example, in HOECHST U.S. Pat. No. 3,225,005.

The stage (f) of depressurizing the mixture resulting from stage (e) is carried out so as to separate, from the aqueous suspension of the stabilized polymer, a vapour phase comprising:

unpolymerized trioxane;
water;
formaldehyde produced by the hydrolysis and
possibly, if the polymerization was carried out in the presence of an organic solvent, at least a part of the latter.

According to the invention, the vapour phase thus separated from the mixture is recycled directly into the formaldehyde trimerization stage (a), this measure forming an essential feature of the invention.

This direct recycling has several advantages. First of all, if some of the polymer is possibly entrained with the vapour phase, it is decomposed into formol in the trimerization medium and does not further interfere.

Moreover, it has been observed with surprise that the aqueous suspension of the stabilized polymer is practically free from formaldehyde. Therefore, according to the process of the invention, the formaldehyde produced by the hydrolysis may be recycled into the trimerization stage (a) without any additional treatment.

According to a preferred procedure for the process of the invention, the trimerization stage (a) is carried out under at least a partial vacuum. When, the polymerization of the trioxane has, in addition, been carried out in the presence of an organic solvent in which trioxane is at least partially soluble, as mentioned above, this solvent is separated completely with the vapour phase obtained by depressurizing the mixture resulting from stage (e). Therefore, the aqueous suspension of the stabilized polymer must not be subjected to any treatment for the removal (for example by "stripping") of the residual organic solvent.

The stage (g) for the recovery of the stabilized polymer from the aqueous suspension thereof may be carried out by employing any conventional solid-liquid separation method. The polymer is generally separated from the said suspension by filtration, followed by washing with water and drying.

If required, the dried polyacetal obtained may then be granulated in the presence of conventional additives (antioxidants and the like).

BRIEF DESCRIPTION OF THE DRAWINGS

The process according to the invention is made clear by the description of a practical embodiment which follows. This description, given as an illustration of the invention, refers to the two sheets of drawings containing the FIGS. 1 and 2 attached.

DESCRIPTION OF THE PREFERRED EMBODIMENTS

Figure 1:
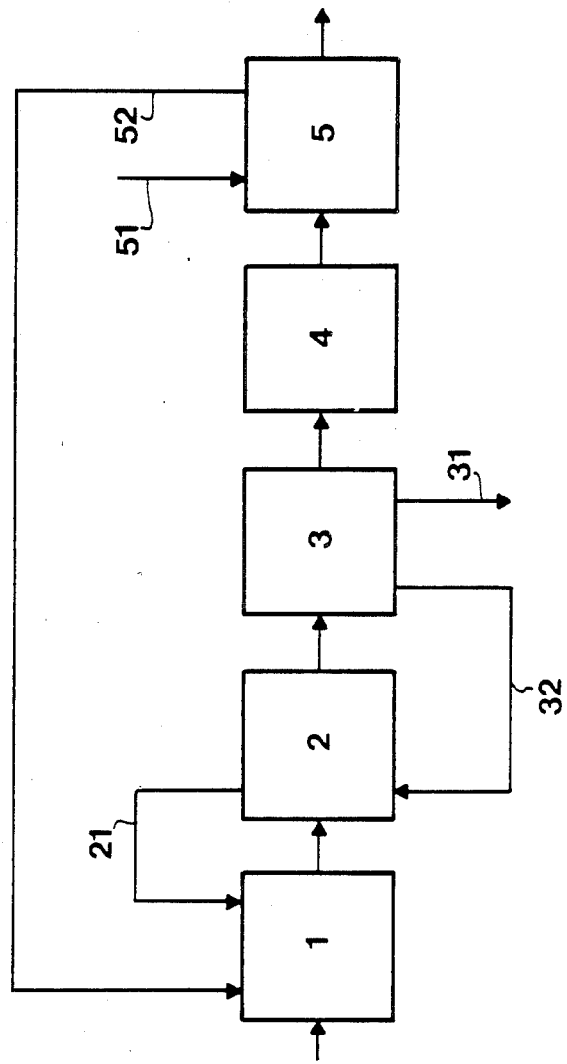
FIG. 1 illustrates diagrammatically (block diagram) a typical arrangement of the main stages constituting the process according to the invention. The scope of the invention will be better understood by a comparison of this FIG. 1 to FIG. 2 which illustrates diagrammatically a conventional arrangement of the main stages constituting a process according to the prior art (the same reference numbers on each of these two figures refer to the same constituent stages of each of the processes respectively).

According to these figures, the synthesis of trioxane is carried out in stage 1 involving the trimerization of formaldehyde in an aqueous solution, for example 55% by weight, in the presence of an acid catalyst such as phosphoric acid; as this reaction reaches equilibrium, the equilibrium is shifted by vapourizing a part of the reaction medium; the reaction is typically carried out under partial vacuum (for example 700 mbar) and at 90° C., with boiling.

The trioxane present in the aqueous phase (enriched by rectification, which is not shown) is extracted therefrom (stage 2) with an organic solvent which is typically a $C_{7-9}$ paraffin cut, so as to separate an aqueous phase containing formaldehyde which is low in trioxane, which phase is reconcentrated and directed (21) to the trimerization stage 1 and a trioxane-rich organic phase which is treated, in the rectification-purification stage 3, in a rectification line so as to separate, on the one hand, water and impurities (31) (which are directed towards incineration) and, on the other hand, the trioxane solution which is cooled in order to crystallize the cyclic trimer, the organic solvent being returned (32) to the extraction stage 2.

The trioxane which is purified by crystallization is suspended in a previously purified extractant solvent fraction and polymerized (stage 4) typically at 60° C. in the presence of a cationic initiator (such as $BF_3O(C_2H_5)_2$) and ethylene oxide as the comonomer.

The reaction mixture originating from stage 4 typically contains, by weight, 25% of copolymer, 25% of trioxane and 50% of organic solvent and is treated (stage 5) with water (51), typically at 150° C. at an average pressure of 8 bar so as to stabilize the polymer by hydrolysis.

Figure 2:
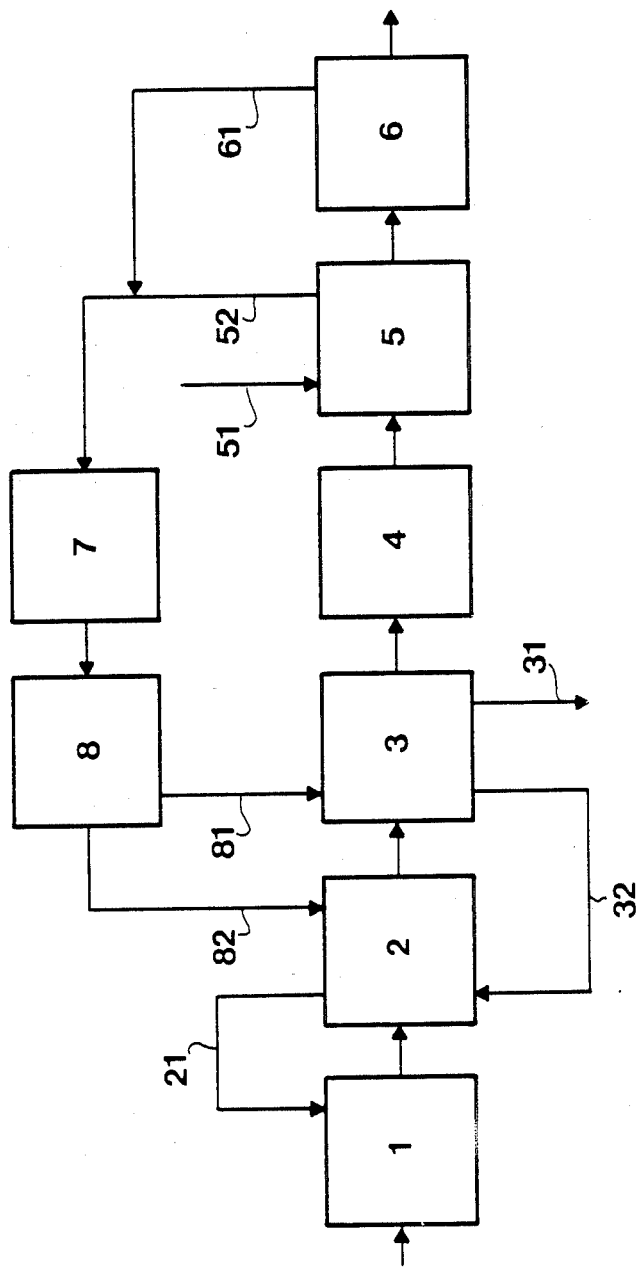

Referring more particularly to FIG. 2 (conventional arrangement of the stages), it is observed that after stage 5, the aqueous suspension of the polymer, which is depressurized to atmospheric pressure, is subjected to an additional stripping 6, which is required for removing (61) the remainder of organic solvent in this suspension, before being filtered and before the polymer is washed and subsequently dried (not shown). The vapours released by the depressurization (52), containing formaldehyde (typically 10% by weight relative to the weight of the polymer), water, trioxane and the organic solvent, are directed towards a condenser (7) followed by a decanter (8), from which the solvent and trioxane are recycled (81) towards the rectification equipment in stage 3 whereas the remaining part, comprising water and formaldehyde, is returned (82) to the trioxane extraction stage.

The progress of the process carried out according to the practical embodiment illustrated diagrammatically in FIG. 2 is gradually disturbed by the polymer being entrained during the depressurization following stage 5, which blocks the condenser (7) and the recycling circuits (52, 61, 81 and 82) in the long-term.

Referring now to FIG. 1 (process according to the invention), it is observed that the vapours released by the depressurization of the aqueous suspension of the polymer originating from stage 5 are recycled (52) directly into the trimerization reactor (1). In this way, the entrained polymer is decomposed into formol in the trimerization medium (1) and does not further interfere; as the trimerizer (1) operates under partial vacuum, the entire quantity of the organic solvent is removed from the aqueous suspension of the polymer; the stripping stage (6) becomes unnecessary; moreover, this aqueous suspension of the polymer being practically free from formol, the formaldehyde released during the hydrolysis is recycled directly into the trimerization stage without any further treatment.

I claim:

1. Process for the manufacture of polyacetals by the polymerization of trioxane, which comprises the following successive main stages:
    (a) trimerization of formaldehyde into trioxane in an acid aqueous phase under a partial vacuum;
    (b) separation of the trioxane from the said aqueous phase;
    (c) purification of the trioxane;
    (d) polymerization of the purified trioxane in the presence of a cationic initiator and a comonomer chosen from amongst cyclic ethers containing at least two adjacent carbon atoms;
    (e) stabilization of the end groups of the macromolecular chains of the polymer by hydrolysis, in the heated state, under pressure;
    (f) separation, by depressurization, of the mixture resulting from state (e), into an aqueous suspension of the stabilized polymer and a vapour phase containing the unpolymerized trioxane, water and the formaldehyde produced by the hydrolysis;
    (g) recycling the vapour phase obtained in stage (f) directly into the formaldehyde trimerization stage (a); and
    (h) recovery of the stabilized polymer from the aqueous suspension resulting from stage (f).

2. Process according to claim 1, characterized in that the separation (b) of trioxane from the aqueous phase comprises the extraction of trioxane from this aqueous phase with an organic solvent chosen from amongst the aliphatic hydrocarbons.

3. Process according to claim 2, characterized in that the trioxane purification stage (c) comprises the crystallization of a mixture containing trioxane and the extractant organic solvent.

4. Process according to claim 1, characterized in that the polymerization stage (d) is carried out in an organic solvent chosen from amongst the aliphatic hydrocarbons.

5. Process according to claim 2, characterized in that the organic solvent in which the polymerization (d) is carried out is the extractant solvent.

* * * * *